(12) United States Patent
Jones et al.

(10) Patent No.: US 9,664,078 B2
(45) Date of Patent: May 30, 2017

(54) PCV CHANNEL DISCONNECT DETECTION DEVICE AND METHOD

(71) Applicant: GM GLOBAL TECHNOLOGY OPERATIONS LLC, Detroit, MI (US)

(72) Inventors: Marie-Christine G. Jones, Bingham Farms, MI (US); John Mark Lorentz, Waterford, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 262 days.

(21) Appl. No.: 14/338,991

(22) Filed: Jul. 23, 2014

(65) Prior Publication Data
US 2016/0024983 A1   Jan. 28, 2016

(51) Int. Cl.
| | |
|---|---|
| *F01M 13/00* | (2006.01) |
| *F02D 41/22* | (2006.01) |
| *F02M 25/06* | (2016.01) |
| *F02D 41/00* | (2006.01) |

(52) U.S. Cl.
CPC .............. *F01M 13/00* (2013.01); *F02D 41/22* (2013.01); *F02M 25/06* (2013.01); *F01M 2013/0044* (2013.01); *F01M 2013/0083* (2013.01); *F02D 41/0025* (2013.01); *Y02T 10/40* (2013.01)

(58) Field of Classification Search
CPC ........ F01M 13/00; F01M 11/10; F01M 1/18; F01M 2013/0083; F01M 2013/0055; F02M 35/1022; F02D 41/22; F02D 41/062; F02D 14/22

USPC ............... 123/572–574, 41.86; 701/101–104
See application file for complete search history.

(56) References Cited

U.S. PATENT DOCUMENTS

| | | | |
|---|---|---|---|
| 7,080,547 B2 * | 7/2006 | Beyer | F01M 11/10 73/114.01 |
| 7,891,346 B2 * | 2/2011 | Asanuma | F02M 25/06 123/572 |

(Continued)

OTHER PUBLICATIONS

Audi of America, LLC; Service Training Manual, "The 2.0L 4V TFSI Engine with AVS Self-Study Program 922903", printed Jul. 2009.

*Primary Examiner* — Long T Tran
(74) *Attorney, Agent, or Firm* — Quinn Law Group, PLLC

(57) ABSTRACT

A Positive Crankcase Ventilation (PCV) channel disconnect detection device and method is provided for an engine having a crankcase, an intake system for delivering metered air to the engine, and a PCV channel for containing PCV gas flow between the crankcase and the intake system and having a first end and a second end. The PCV channel disconnect detection device includes a detection channel that supplies unmetered air surrounding one of the ends of the PCV channel to a post-throttle portion of the intake system. The detection channel is inoperable in response to a vacuum in the post-throttle portion of the intake system if the PCV channel connection is connected. The detection channel is operable in response to the vacuum in the post-throttle portion of the intake system if the PCV channel is disconnected. The detection channels may be configured to bypass all flow restrictions in the PCV system.

15 Claims, 3 Drawing Sheets

(56) References Cited

U.S. PATENT DOCUMENTS

| | | | |
|---|---|---|---|
| 8,371,262 B2* | 2/2013 | Mordukhovich | F01M 1/10 123/196 A |
| 8,392,098 B2* | 3/2013 | Yamashita | F01M 13/00 123/572 |
| 8,844,507 B2* | 9/2014 | Kitayama | F01M 13/00 123/572 |
| 2005/0022795 A1* | 2/2005 | Beyer | F01M 11/10 123/516 |
| 2011/0023852 A1* | 2/2011 | Yamashita | F01M 13/00 123/574 |
| 2013/0282255 A1* | 10/2013 | Pursifull | G01F 23/0076 701/102 |
| 2013/0291843 A1* | 11/2013 | Kitayama | F01M 13/00 123/574 |
| 2013/0340732 A1* | 12/2013 | Pursifull | F02M 35/10222 123/572 |
| 2014/0081551 A1* | 3/2014 | Rollinger | F01M 11/10 701/101 |
| 2014/0149015 A1* | 5/2014 | Pursifull | F02M 25/06 701/101 |

* cited by examiner

PCV CHANNEL DISCONNECT DETECTION DEVICE AND METHOD

TECHNICAL FIELD

This disclosure for a vehicle engine relates to a PCV channel disconnect detection device and method.

BACKGROUND

Vehicle internal combustion engines typically include a Positive Crankcase Ventilation (PCV) system. The PCV system routes gases that accumulate in the engine crankcase from the crankcase to the intake system via a PCV channel or hose. It may be beneficial to detect a disconnection of the PCV channel or hose.

SUMMARY

A PCV channel disconnect detection device for an internal combustion engine is provided. The engine has a crankcase, an intake system for delivering metered air to the internal combustion engine and including a low vacuum pre-throttle portion and a high vacuum post-throttle portion, a PCV system including a PCV channel for containing PCV gas flow between the crankcase and the pre-throttle portion of the intake system that has a first end and a second end, and an engine diagnostic system. The PCV channel disconnect detection device includes a detection channel that supplies unmetered air surrounding one of the ends of the PCV channel to the post-throttle portion of the intake system. The detection channel is configured to be inoperable in response to the vacuum in the post-throttle portion of the intake system if the PCV channel connection is connected. The detection channel is configured to be operable in response to the vacuum in the post-throttle portion of the intake system if the PCV channel is disconnected.

The PCV channel disconnect detection device may also include a crankcase attachment feature, an intake system attachment feature, a first PCV channel coupling, a second PCV channel coupling, and a first detection channel. The crankcase attachment feature may be formed on the crankcase and may have a crankcase outlet for PCV gas flow into and out of the crankcase and a first detection feature. The intake system attachment feature may be formed on the pre-throttle portion of the intake system and may have an intake system inlet for PCV gas flow into or out of the pre-throttle portion of the intake system and a second detection feature. The first PCV channel coupling may be connected to the first end of the PCV channel, connectable to the crankcase attachment feature, and may have a PCV channel inlet for containing the flow of PCV gas from the crankcase outlet into or out of the first end of the PCV channel and a third detection feature. The second PCV channel coupling may be connected to the second end of the PCV channel, connectable to the intake system attachment feature, and may have a PCV channel outlet for containing the flow of PCV gas from the second end of the PCV channel into or out of the intake system inlet and a fourth detection feature. The first detection channel may have a first end connected to one of the first and third detection features and a second end connected to the post-throttle portion of the intake system and may contain unmetered air flow from one of the first and third detection features to the post-throttle portion of the intake system. The detection channel may be a second detection channel and may have a first end connected to the fourth detection feature and a second end connected to one of the post-throttle portion of the intake system and the third detection feature and may contain unmetered air flow from the fourth detection feature to the post-throttle portion of the intake system.

The first and third detection features may be configured to cooperate such that unmetered air is prevented from flowing between the first and third detection features and into the first end of the first detection channel when the first PCV channel coupling is connected to the crankcase attachment feature. The second and fourth detection features may be configured to cooperate such that unmetered air is prevented from flowing between the second and fourth detection features and into the first end of the second detection channel when the second PCV channel coupling is connected to the intake system attachment feature. The detection channels and the respective detection features may be configured to permit sufficient unmetered air flow to enter the post-throttle portion of the intake system to be detected by the engine diagnostic system when any one of the PCV channel couplings is disconnected from its respective attachment feature. The detection channels may be configured to bypass all flow restrictions in the PCV system.

A vehicle is also provided. The vehicle has an internal combustion engine including a crankcase, an intake system for delivering metered air to the internal combustion engine and having a low vacuum pre-throttle portion and a high vacuum post-throttle portion, a PCV system having a PCV channel for containing PCV gas flow between the crankcase and the pre-throttle portion of the intake system and including a first end and a second end, an engine diagnostic system, and a PCV channel disconnect detection device. The PCV channel disconnect detection device includes a detection channel that supplies unmetered air surrounding one of the ends of the PCV channel to the post-throttle portion of the intake system. The detection channel is configured to be inoperable in response to the high vacuum in the post-throttle portion of the intake system if the PCV channel connection is connected. The detection channel is configured to be operable in response to the high vacuum in the post-throttle portion of the intake system if the PCV channel is disconnected.

The PCV channel disconnect detection device may also include a crankcase attachment feature, an intake system attachment feature, a first PCV channel coupling, a second PCV channel coupling, and a first detection channel. The crankcase attachment feature may be formed on the crankcase and may have a crankcase outlet for PCV gas flow into and out of the crankcase and a first detection feature. The intake system attachment feature may be formed on the pre-throttle portion of the intake system and may have an intake system inlet for PCV gas flow into and out of the pre-throttle portion of the intake system and a second detection feature. The first PCV channel coupling may be connected to the first end of the PCV channel, connectable to the crankcase attachment feature, and may have a PCV channel inlet for containing the flow of PCV gas from the crankcase outlet into or out of the first end of the PCV channel and a third detection feature. The second PCV channel coupling may be connected to the second end of the PCV channel, connectable to the intake system attachment feature, and may have a PCV channel outlet for containing the flow of PCV gas from the second end of the PCV channel into or out of the intake system inlet and a fourth detection feature. The first detection channel may have a first end connected to one of the first and third detection features and a second end connected to the post-throttle portion of the intake system and may contain unmetered air flow from one of the first and third detection features to the post-throttle portion of the intake system. The detection channel may be a second detection channel having a first end connected to the fourth detection feature and a second end connected to one of the post-throttle portion of the intake system and the third detection feature and may contain unmetered air flow from the fourth detection feature to the post-throttle portion of the intake system.

The first and third detection features may be configured to cooperate such that unmetered air is prevented from flowing between the first and third detection features and into the first end of the first detection channel when the first PCV channel coupling is connected to the crankcase attachment feature. The second and fourth detection features may be configured to cooperate such that unmetered air is prevented from flowing between the second and fourth detection features and into the first end of the second detection channel when the second PCV channel coupling is connected to the intake system attachment feature. The detection channels and the respective detection features may be configured to permit sufficient unmetered air flow to enter the post-throttle portion of the intake system to be detected by the engine diagnostic system when any one of the PCV channel couplings is disconnected from its respective attachment feature. The detection channels may be configured to bypass all flow restrictions in the PCV system.

A method to detect a disconnect of a PCV channel connection in an internal combustion engine having a PCV system is also provided. The method includes providing a detection channel that supplies unmetered air surrounding the PCV channel connection to a post-throttle portion of the air intake system. The detection channel is inoperable in response to a vacuum in the post-throttle portion of the air intake system if the PCV channel connection is connected, and the detection channel is operable in response to the vacuum in the post-throttle portion of the air intake system if the PCV channel is disconnected. Providing a detection channel may include providing a detection channel that bypasses all flow restrictions in the PCV system.

The PCV channel disconnect detection device and method provided enable the detection of a disconnect of the PCV channel or hose.

The above features and advantages and other features and advantages of the present teachings are readily apparent from the following detailed description of the best modes for carrying out the present teachings when taken in connection with the accompanying drawings.

DETAILED DESCRIPTION

Figure 1:
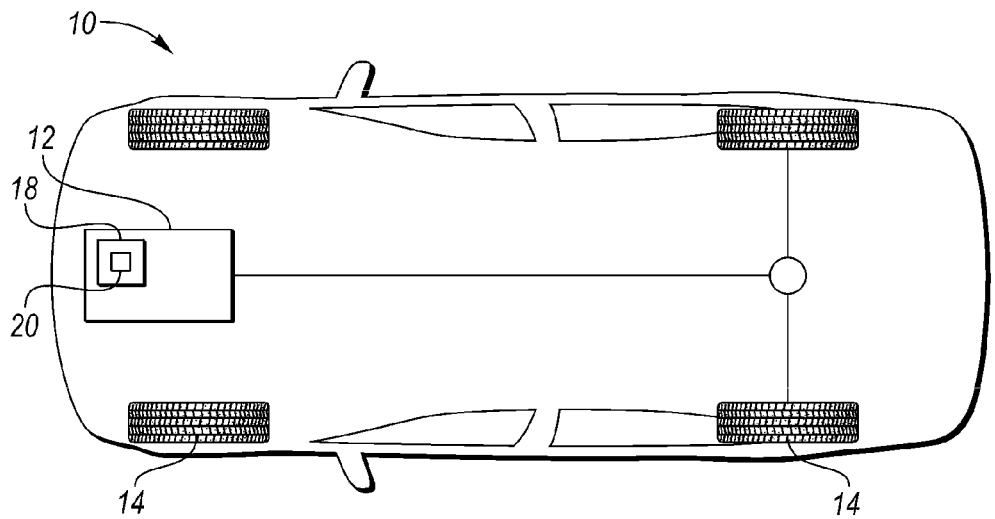
FIG. 1 is a schematic illustration of a vehicle having an internal combustion engine including a PCV channel disconnect detection device.

Referring to the drawings, wherein like reference numbers refer to like components throughout the views, FIG. 1 shows a vehicle 10 having an internal combustion engine 12 and wheels 14. The internal combustion engine 12 is operatively connected to one or more of the wheels 14 to provide power to move the vehicle 10. The engine 12 includes a Positive Crankcase Ventilation (PCV) system 18. The PCV system 18 includes a PCV channel disconnect detection device 20 to be described in detail below.

Figure 2:
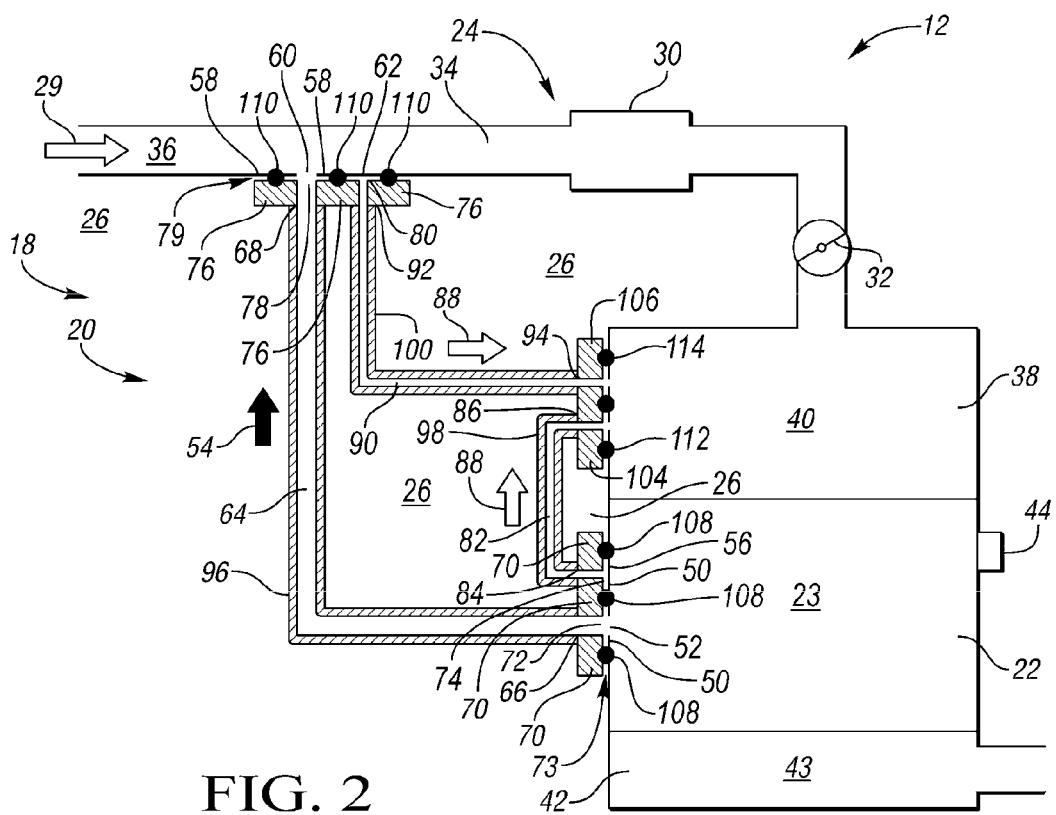
FIG. 2 is a schematic illustration of an embodiment the PCV channel disconnect detection device of FIG. 1.

Referring now to FIG. 2, the engine 12 also includes an intake system 24 and an exhaust system 42. The intake system 24 routes metered air flow 29 into the engine 12 combustion chambers (not shown). Ambient or unmetered air 26 becomes metered air flow 29 after it enters the intake system 24. The intake system 24 also includes a throttle 32 for controlling the metered air flow 29, a pre-throttle portion 34 of the intake system 24 having a low vacuum 36, and a post-throttle portion 38 of the intake system 24 having a high vacuum 40 relative to the low vacuum 36. The intake system 24 may also have a turbocharger 30, a charge air cooler (not shown), and other components. The exhaust system 42 routes exhaust gases 43 from the engine 12 combustion chambers (not shown) away from the vehicle 10, among other functions. The engine 12 includes an engine diagnostic system 44. The engine diagnostic system 44 may include one or more sensors located in the intake system 24 and/or in the exhaust system 42 and/or in other locations. Examples of sensors that may be included in the engine diagnostic system 44 include, but are not limited to, mass air flow sensors, manifold absolute pressure sensors, oxygen sensors, and barometric pressure sensors.

The engine 12 also includes a crankcase 22. The PCV system 18 routes PCV gases 23 from the crankcase 22 to the intake system 24 via a PCV channel 64. The PCV channel may be a hose 96. The PCV channel 64 or hose 96 contains the PCV gas flow 54 between the crankcase 22 and the intake system 24. The PCV channel 64 includes a first end 66 and a second end 68. The PCV system 18 may have a variety of configurations, each of which may include other channels (not shown) and flow control devices (not shown) for routing and controlling the flow of PCV gases 23 and air 26 in the PCV system 18. The PCV system 18 channels may include, but are not limited to, hoses, tubes, and internal passages formed in the engine 12, and charge air cooler passages. The PCV system 18 flow control devices may include, but are not limited to, check valves, pressure control valves, pressure regulating valves, orifices, nozzles, PCV valves, throttle valves 32, internal passages, and turbochargers 30. The PCV system 18 flow control devices and the PCV system 18 channels may create flow restrictions that impede the flow of PCV gases 23 or air 26 in the PCV system 18.

The PCV channel disconnect detection device 20 includes a crankcase attachment feature 50, an intake system attachment feature 58, a first PCV channel coupling 70, a second PCV channel coupling 76, a first detection channel 82 and a second detection channel 90.

The crankcase attachment feature 50 is formed on the crankcase and has a crankcase outlet 52 for PCV gas flow 54 into or out of the crankcase 22 and a first detection feature 56. The crankcase outlet 52 may be an opening formed in the crankcase 22, as shown, or may be any other suitable configuration. The first detection feature 56 may be a flat surface, as shown, or may be any other suitable configuration. Alternatively, the crankcase attachment feature 50 may be included on a separate part (not shown) that is attached to the crankcase 22.

The intake system attachment feature 58 is formed on the pre-throttle portion 34 of the intake system 24 and has an intake system inlet 60 for PCV gas flow 54 into or out of the pre-throttle portion 34 of the intake system 24 and a second detection feature 62. The intake system inlet 60 may be an opening formed in the pre-throttle portion 34 of the intake system 24, as shown, or may be any other suitable configuration. The second detection feature 62 may be a flat surface, as shown, or may be a curved surface or any other suitable configuration. Alternatively, the intake system attachment feature 58 may be included on a separate part (not shown) that is attached to the pre-throttle portion 34 of the intake system 24.

The first PCV channel coupling 70 is connected to the first end 66 of the PCV channel 64, is connectable to the crankcase attachment feature 50, and has a PCV channel inlet 72 for containing the PCV gas flow 54 from the crankcase outlet 52 into or out of the first end 66 of the PCV channel 64 and a third detection feature 74. The PCV channel inlet 72 may be an opening formed in the first PCV channel coupling 70, as shown, or may be any other suitable configuration. The third detection feature 74 may be an opening formed in the first PCV channel coupling 70, as shown, or may be any other suitable configuration. The first PCV channel coupling 70 may be connectable to the crankcase attachment feature 50 via one or more fasteners (not shown), or via any other suitable connection method. A first PCV channel connection 73 may be created when the first PCV channel coupling 70 is connected to the crankcase attachment feature 50. One of the first PCV channel coupling 70 and the crankcase attachment feature 50 may include a seal or gasket 108 to seal the first PCV channel connection 73.

The second PCV channel coupling 76 is connected to the second end 68 of the PCV channel 64, is connectable to the intake system attachment feature 58, and has a PCV channel outlet 78 for containing PCV gas flow 54 from the second end 68 of the PCV channel 64 into or out of the intake system inlet 60 and a fourth detection feature 80. The PCV channel outlet 78 may be an opening formed in the second PCV channel coupling 76, as shown, or may be any other suitable configuration. The fourth detection feature 80 may be an opening formed in the second PCV channel coupling 76, as shown, or may be any other suitable configuration. The second PCV channel coupling 76 may be connectable to the intake system attachment feature 58 via one or more fasteners (not shown), or via any other suitable connection method. A second PCV channel connection 79 may be created when the second PCV channel coupling 76 is connected to the intake system attachment feature 58. One of the second PCV channel coupling 76 and the intake system attachment feature 58 may include a seal or gasket 110 to seal the second PCV channel connection 79.

The first detection channel 82 has a first end 84 connected to the third detection feature 74 and a second end 86 connected to the post-throttle portion 38 of the intake system 24 and contains unmetered air flow 88 from the third detection feature 74 to the post-throttle portion 38 of the intake system 24 when the first PCV channel coupling 70 is disconnected. The first detection channel 82 may be configured to bypass all flow restrictions in the PCV system 18. The bypassed PCV system 18 flow restrictions may include, but are not limited to, flow control devices such as check valves, pressure control valves, pressure regulating valves, orifices, nozzles, PCV valves, throttle valves 32, turbochargers 30, and channels such as internal passages formed in the engine 12 and charge air cooler passages. The first detection channel 82 may include a hose 98. The hose 98 may be a vacuum hose. The first detection channel 82 second end 86 connection to the post-throttle portion 38 of the intake system 24 may include a first detection channel coupling 104, a seal or gasket 112, and one or more fasteners (not shown).

The second detection channel 90 has a first end 92 connected to the fourth detection feature 80 and a second end 94 connected to the post-throttle portion 38 of the intake system 24 and contains unmetered air flow 88 from the fourth detection feature 80 to the post-throttle portion 38 of the intake system 24 when the second PCV channel coupling 76 is disconnected. The second detection channel 90 may be configured to bypass all flow restrictions in the PCV system 18. The bypassed PCV system 18 flow restrictions may include, but are not limited to, flow control devices such as check valves, pressure control valves, pressure regulating valves, orifices, nozzles, PCV valves, throttle valves 32, turbochargers 30, and channels such as internal passages formed in the engine 12 and charge air cooler passages. The second detection channel 90 may include a hose 100. The hose 100 may be a vacuum hose. The second detection channel 90 second end 94 connection to the post-throttle portion 38 of the intake system 24 may include a second detection channel coupling 106, a seal or gasket 114, and one or more fasteners (not shown). The first and second detection channel couplings 104, 106 may be combined into a single coupling, as shown, or may be separate. Similarly, the first and second detection channel seals or gaskets 112, 114 may be combined into a single seal or gasket or may be separate.

The first and third detection features 56, 74 are configured to cooperate such that unmetered air 26 is prevented from flowing between the first and third detection features 56, 74 and into the first end 84 of the first detection channel 82 when the first PCV channel coupling 70 is connected to the crankcase attachment feature 50. The second and fourth detection features 62, 80 are configured to cooperate such that unmetered air 26 is prevented from flowing between the second and fourth detection features 62, 80 and into the first end 92 of second detection channel 90 when the second PCV channel coupling 76 is connected to the intake system attachment feature 58. The detection channels 82, 90 and the respective detection features 56, 62, 74, 80 are configured to permit sufficient unmetered air flow 88 to enter the post-throttle portion 38 of the intake system 24 to be detected by the engine diagnostic system 44 when any one of the PCV channel couplings 70, 76 is disconnected from its respective attachment feature 50, 58.

Figure 3:
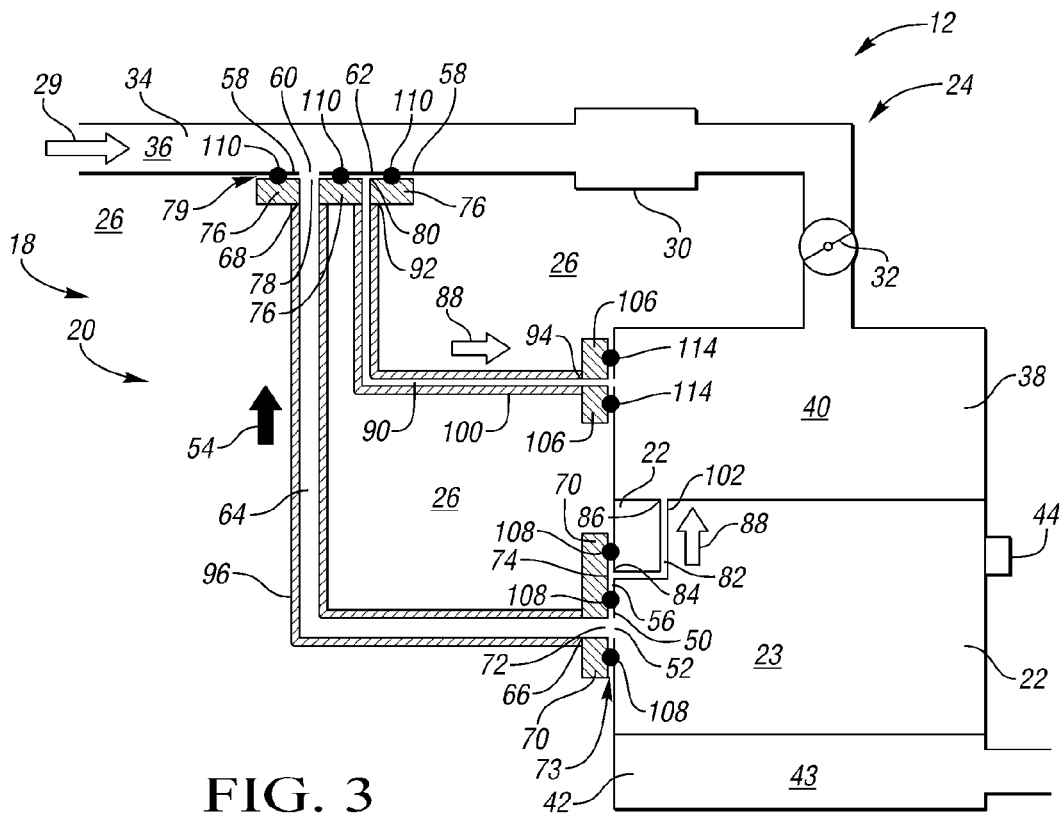
FIG. 3 is a schematic illustration of a second embodiment of the PCV channel disconnect detection device of FIG. 1.

Referring now to FIG. 3, in a second embodiment of the PCV channel disconnect detection device 20, the first detection channel 82 includes an internal channel 102 formed in the engine 12. The first detection channel 82 first end 84 is connected to the first detection feature 56 and the second end 86 is connected to the post-throttle portion 38 of the intake system 24 and contains unmetered air flow 88 from the first detection feature 56 to the post-throttle portion 38 of the intake system 24 when the first PCV channel coupling 70 is disconnected. The first detection feature 56 may be an opening formed in the crankcase attachment feature 50, as shown, or may be any other suitable configuration. The third detection feature 74 may be a flat surface, as shown, or may be any other suitable configuration.

As in the first embodiment, the first and third detection features 56, 74 are configured to cooperate such that unmetered air 26 is prevented from flowing between the first and third detection features 56, 74 and into the first end 84 of the first detection channel 82 when the first PCV channel coupling 70 is connected to the crankcase attachment feature 50. The second and fourth detection features 62, 80 are configured to cooperate such that unmetered air 26 is prevented from flowing between the second and fourth detection features 62, 80 and into the first end 92 of second detection channel 90 when the second PCV channel coupling 76 is connected to the intake system attachment feature 58. The detection channels 82, 90 and the respective detection features 56, 62, 74, 80 are configured to permit sufficient unmetered air flow 88 to enter the post-throttle portion 38 of the intake system 24 to be detected by the engine diagnostic system 44 when any one of PCV channel couplings 70, 76 is disconnected from its respective attachment feature 50, 58.

Figure 4:
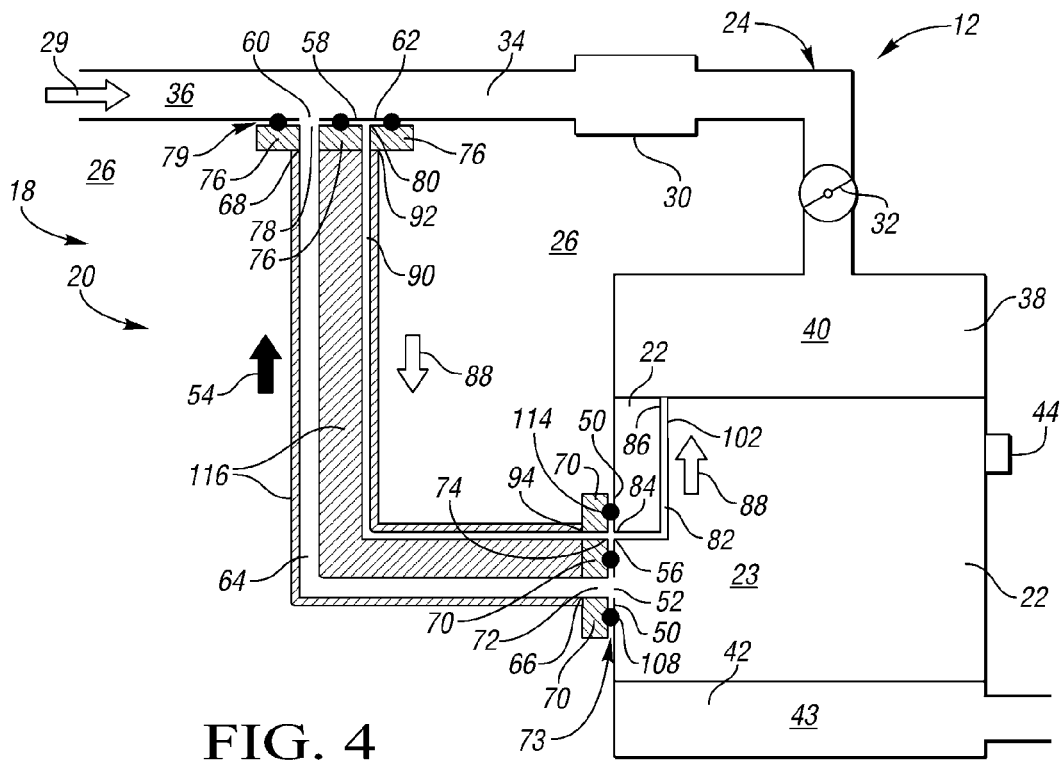
FIG. 4 is a schematic illustration of a third embodiment of the PCV channel disconnect detection device of FIG. 1.

Referring now to FIG. 4, in a third embodiment of the PCV channel disconnect detection device 20, the first detection channel 82 includes the internal channel 102 formed in the engine 12. The first detection channel 82 first end 84 is connected to the first detection feature 56 and the second end 86 is connected to the post-throttle portion 38 of the intake system 24 and contains unmetered air flow 88 from the first detection feature 56 to the post-throttle portion 38 of the intake system 24 when any one of the PCV channel couplings 70, 76 is disconnected from its respective attachment feature 50, 58. The first detection feature 56 may be an opening formed in the crankcase attachment feature 50, as shown, or may be any other suitable configuration. The third detection feature 74 may be an opening formed in the first PCV channel coupling, as shown, or may be any other suitable configuration. The second detection channel 90 first end 92 is connected to the fourth detection feature 80 and the second end 94 is connected to the third detection feature 74. The PCV channel 64 and the second detection channel 90 may be configured to both be included in a dual path hose 116. The dual path hose 116 may be a single piece that includes two separate and substantially parallel channels, as shown.

As in the first and second embodiments, the first and third detection features 56, 74 are configured to cooperate such that unmetered air 26 is prevented from flowing between the first and third detection features 56, 74 and into the first end 84 of the first detection channel 82 when the first PCV channel coupling 70 is connected to the crankcase attachment feature 50. The second and fourth detection features 62, 80 are configured to cooperate such that unmetered air 26 is prevented from flowing between the second and fourth detection features 62, 80 and into the first end 92 of the second detection channel 90 when the second PCV channel coupling 76 is connected to the intake system attachment feature 58. The detection channels 82, 90 and the respective detection features 56, 62, 74, 80 are configured to permit sufficient unmetered air flow 88 to enter the post-throttle portion 38 of the intake system 24 to be detected by the engine diagnostic system 44 when any one of PCV channel couplings 70, 76 is disconnected from its respective attachment feature 50, 58.

Figure 5:
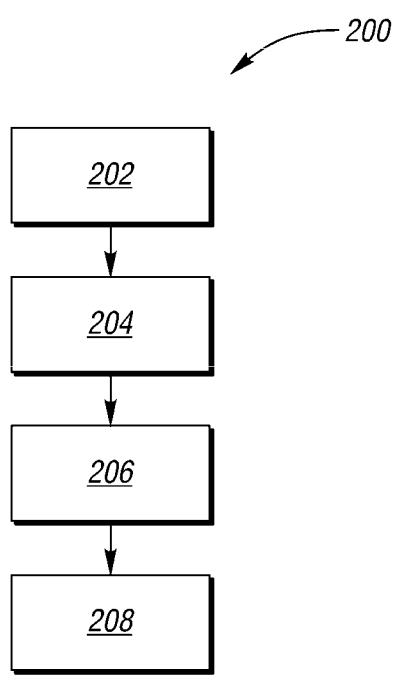
FIG. 5 is a flow chart of a method to detect a disconnect of a PCV channel connection in an internal combustion engine.

Referring to FIG. 5, a method 200 for detecting a disconnect of a PCV channel connection 73, 79 in an internal combustion engine 12 is provided. The method 200 includes providing 202 a detection channel 82, 90 that supplies unmetered air 26 surrounding the PCV channel connection 73, 79 to a post-throttle portion 38 of the air intake system 24. The detection channel 82, 90 is inoperable in response to a vacuum 40 in the post-throttle portion 38 of the air intake system 24 if the PCV channel connection 73, 79 is connected, and the detection channel 82, 90 is operable in response to the vacuum 40 in the post-throttle portion 38 of the air intake system 24 if the PCV channel connection 73, 79 is disconnected.

Providing 202 a detection channel 82, 90 may include providing a detection channel 82, 90 that bypasses all flow restrictions in the PCV system 18. The bypassed PCV system 18 flow restrictions may include, but are not limited to, flow control devices such as check valves, pressure control valves, pressure regulating valves, orifices, nozzles, PCV valves, throttle valves 32, and turbochargers 30, and channels such as internal passages formed in the engine 12 and charge air cooler passages. The method 200 may include detecting 208 the operation of the detection channel 82, 90 with an engine diagnostic system 44. The method 200 may include sealing 204 the detection channel 82, 90 at the PCV channel connection 73, 79 when the PCV channel connection 73, 79 is connected and unsealing 206 the detection channel 82, 90 at the PCV channel connection 73, 79 when the PCV channel connection 73, 79 is disconnected.

While the best modes for carrying out the many aspects of the present teachings have been described in detail, those familiar with the art to which these teachings relate will recognize various alternative aspects for practicing the present teachings that are within the scope of the appended claims.

The invention claimed is:

1. A PCV channel disconnect detection device for an internal combustion engine having a crankcase, an intake system for delivering metered air to the internal combustion engine and including a low vacuum pre-throttle portion and a high vacuum post-throttle portion, a PCV system, and an engine diagnostic system, the PCV channel disconnect detection device comprising: a PCV channel configured to contain PCV gas flow between the crankcase and the pre-throttle portion of the intake system and having a first end connectable to the crankcase and a second end connectable to the pre-throttle portion of the intake system and a detection channel that supplies unmetered air surrounding one of the ends of the PCV channel to the post-throttle portion of the intake system; wherein the detection channel is configured to be inoperable in response to the vacuum in the post-throttle portion of the intake system when the one of the ends of the PCV channel is connected; and wherein the detection channel is configured to be operable in response to the vacuum in the post-throttle portion of the intake system when the one of the ends of the PCV channel is disconnected such that sufficient unmetered air is supplied to the post-throttle portion of the intake system to be detected by the engine diagnostic system.

2. The PCV channel disconnect detection device of claim 1, further comprising:
a crankcase attachment feature formed on the crankcase and having a crankcase outlet for PCV gas flow into or out of the crankcase and having a first detection feature;
an intake system attachment feature formed on the pre-throttle portion of the intake system and having an intake system inlet for PCV gas flow into or out of the pre-throttle portion of the intake system and having a second detection feature;
a first PCV channel coupling connected to the first end of the PCV channel, connectable to the crankcase attachment feature, and having a PCV channel inlet for containing PCV gas flow from the crankcase outlet into or out of the first end of the PCV channel and having a third detection feature;
a second PCV channel coupling connected to the second end of the PCV channel, connectable to the intake system attachment feature, and having a PCV channel outlet for containing PCV gas flow from the second end of the PCV channel into or out of the intake system inlet and having a fourth detection feature; and a first detection channel having a first end connected to one of the first and third detection features and a second end connected to the post-throttle portion of the intake system for containing unmetered air flow from one of the first and third detection features to the post-throttle portion of the intake system;

wherein the detection channel is a second detection channel having a first end connected to the fourth detection feature and a second end connected to one of the post-throttle portion of the intake system and the third detection feature for containing unmetered air flow from the fourth detection feature to the post-throttle portion of the intake system;

wherein the first and third detection features are configured to cooperate such that unmetered air is prevented from flowing between the first and third detection features and into the first end of the first detection channel when the first PCV channel coupling is connected to the crankcase attachment feature;

wherein the second and fourth detection features are configured to cooperate such that unmetered air is prevented from flowing between the second and fourth detection features and into the first end of the second detection channel when the second PCV channel coupling is connected to the intake system attachment feature; and wherein the detection channels and the respective detection features are configured to permit sufficient unmetered air flow to enter the post-throttle portion of the intake system to be detected by the engine diagnostic system when any one of the PCV channel couplings is disconnected from its respective attachment feature.

3. The PCV channel disconnect detection device of claim 2, wherein the detection channels are configured to bypass all flow restrictions in the PCV system.

4. The PCV channel disconnect detection device of claim 3, wherein the first and second detection channels include a hose.

5. The PCV channel disconnect detection device of claim 3, wherein the first detection channel includes an internal channel formed in the engine and the second detection channel includes a hose.

6. The PCV channel disconnect detection device of claim 5, wherein the PCV channel and the second detection channel are configured to both be included in a dual path hose.

7. A vehicle having an internal combustion engine including a crankcase, an intake system for delivering metered air to the internal combustion engine and having a low vacuum pre-throttle portion and a high vacuum post-throttle portion, a PCV system, an engine diagnostic system, and a PCV channel disconnect detection device comprising: a PCV channel configured to contain PCV gas flow between the crankcase and the pre-throttle portion of the intake system and having a first end connectable to the crankcase and a second end connectable to the pre-throttle portion of the intake system and a detection channel that supplies unmetered air surrounding one of the ends of the PCV channel to the post-throttle portion of the intake system; wherein the detection channel is configured to be inoperable in response to the high vacuum in the post-throttle portion of the intake system when the PCV channel connection is connected; and wherein the detection channel is configured to be operable in response to the high vacuum in the post-throttle portion of the intake system when the PCV channel is disconnected such that sufficient unmetered air is supplied to the post-throttle portion of the intake system to be detected by the engine diagnostic system.

8. The vehicle of claim 7, further comprising:
a crankcase attachment feature formed on the crankcase and having a crankcase outlet for PCV gas flow into or out of the crankcase and having a first detection feature;

an intake system attachment feature formed on the pre-throttle portion of the intake system and having an intake system inlet for PCV gas flow into or out of the pre-throttle portion of the intake system and having a second detection feature;

a first PCV channel coupling connected to the first end of the PCV channel, connectable to the crankcase attachment feature, and having a PCV channel inlet for containing PCV gas flow from the crankcase outlet into or out of the first end of the PCV channel and having a third detection feature;

a second PCV channel coupling connected to the second end of the PCV channel, connectable to the intake system attachment feature, and having a PCV channel outlet for containing PCV gas flow from the second end of the PCV channel into or out of the intake system inlet and having a fourth detection feature; and a first detection channel having a first end connected to one of the first and third detection features and a second end connected to the post-throttle portion of the intake system for containing unmetered air flow from one of the first and third detection features to the post-throttle portion of the intake system;

wherein the detection channel is a second detection channel having a first end connected to the fourth detection feature and a second end connected to one of the post-throttle portion of the intake system and the third detection feature for containing unmetered air flow from the fourth detection feature to the post-throttle portion of the intake system;

wherein the first and third detection features are configured to cooperate such that unmetered air is prevented from flowing between the first and third detection features and into the first end of the first detection channel when the first PCV channel coupling is connected to the crankcase attachment feature;

wherein the second and fourth detection features are configured to cooperate such that unmetered air is prevented from flowing between the second and fourth detection features and into the first end of second detection channel when the second PCV channel coupling is connected to the intake system attachment feature; and wherein the detection channels and the respective detection features are configured to permit sufficient unmetered air flow to enter the post-throttle portion of the intake system to be detected by the engine diagnostic system when any one of the PCV channel couplings is disconnected from its respective attachment feature.

9. The vehicle of claim 8, wherein the detection channels are configured to bypass all flow restrictions in the PCV system.

10. The vehicle of claim 9, wherein the first and second detection channels include hoses.

11. The vehicle of claim 9, wherein the first detection channel includes an internal channel formed in the engine and the second detection channel includes a hose.

12. The vehicle of claim 11, wherein the PCV channel and the second detection channel are configured to both be included in a dual path hose.

13. A method for detecting a disconnect of a PCV channel connection in an internal combustion engine having a PCV system, the method comprising: providing a detection channel that supplies unmetered air surrounding the PCV channel connection to a post-throttle portion of the air intake system; wherein the detection channel is inoperable in response to a vacuum in the post-throttle portion of the air intake system when the PCV channel connection is connected; and wherein the detection channel is operable in response to the vacuum in the post-throttle portion of the air intake system when the PCV channel is disconnected such that sufficient unmetered air is supplied to the post-throttle portion of the intake system to be detected by an engine diagnostic system.

14. The method of claim 13, wherein providing a detection channel includes providing a detection channel that bypasses all flow restrictions in the PCV system.

15. The method of claim 13 further comprising:
sealing the detection channel at the PCV channel connection when the PCV channel connection is connected; and
unsealing the detection channel at the PCV channel connection when the PCV channel connection is disconnected.

* * * * *